US009563193B2

(12) United States Patent
Kitajima

(10) Patent No.: US 9,563,193 B2
(45) Date of Patent: Feb. 7, 2017

(54) INFORMATION PROCESSING METHOD, PROGRAM DEVELOPMENT DEVICE, RECORDING MEDIUM, AND METHOD

(71) Applicant: FUJITSU LIMITED, Kawasaki-shi, Kanagawa (JP)

(72) Inventor: Hironobu Kitajima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 354 days.

(21) Appl. No.: 14/230,569

(22) Filed: Mar. 31, 2014

(65) Prior Publication Data

US 2014/0303797 A1    Oct. 9, 2014

(30) Foreign Application Priority Data

Apr. 5, 2013   (JP) ................. 2013-080005

(51) Int. Cl.
| | |
|---|---|
| G05D 3/12 | (2006.01) |
| G05D 5/00 | (2006.01) |
| G05D 9/00 | (2006.01) |
| G05D 11/00 | (2006.01) |
| G05B 15/02 | (2006.01) |
| F24F 11/00 | (2006.01) |

(52) U.S. Cl.
CPC ........ *G05B 15/02* (2013.01); *F24F 2011/0094* (2013.01); *G05B 2219/2642* (2013.01)

(58) Field of Classification Search
None
See application file for complete search history.

(56) References Cited

U.S. PATENT DOCUMENTS

| | | | |
|---|---|---|---|
| 6,774,506 B2 * | 8/2004 | Hashimoto | ............... H02J 3/14 |
| | | | 307/38 |
| 9,222,688 B2 * | 12/2015 | Ishizaka | ................. F24F 3/065 |
| 2003/0052542 A1 | 3/2003 | Hashimoto et al. | |

(Continued)

FOREIGN PATENT DOCUMENTS

| | | |
|---|---|---|
| JP | 2003-87969 | 3/2003 |
| JP | 2007-129873 | 5/2007 |

(Continued)

OTHER PUBLICATIONS

Japanese Office Action dated Oct. 4, 2016 in corresponding Japanese Patent Application No. 2013-080005.

*Primary Examiner* — Diem Cao
(74) *Attorney, Agent, or Firm* — Staas & Halsey LLP

(57) ABSTRACT

An information processing method to be executed by a processor, the processing method includes setting an area target amount of reduction in power consumption of a target area; acquiring a predicted value and a measured value of outdoor temperature at each of a plurality of subareas included in the target area; calculating, for each of the plurality of subareas, a prediction error of outdoor temperature by calculating a difference between the predicted value and the measured value; calculating, for each of the plurality of subareas, a utilization rate indicating a rate of assignment of the area target amount of reduction in power consumption by solving an objective function generated based on the area target amount of reduction and a variance of the prediction error of outdoor temperature; and determining, for each of the plurality of subareas, a subarea target amount of reduction in power consumption based on the utilization rate.

11 Claims, 15 Drawing Sheets

(56) References Cited

U.S. PATENT DOCUMENTS

| | | | | |
|---|---|---|---|---|
| 2011/0035075 A1* | 2/2011 | Tomita | ............... | F24F 11/006 700/295 |
| 2011/0276527 A1* | 11/2011 | Pitcher | ............... | G06F 17/5009 706/21 |
| 2012/0083927 A1* | 4/2012 | Nakamura | ............... | G05B 13/026 700/278 |
| 2013/0191940 A1* | 7/2013 | Gerdes | ............... | A01H 5/10 800/267 |
| 2014/0067132 A1* | 3/2014 | Macek | ............... | F24F 11/006 700/276 |

FOREIGN PATENT DOCUMENTS

| | | |
|---|---|---|
| JP | 2007-215354 | 8/2007 |
| JP | 2012-23816 | 2/2012 |
| JP | 2012-178935 | 9/2012 |

\* cited by examiner

FIG. 6

| ITEM | SET VALUE |
|---|---|
| TARGET AMOUNT $R^{AC}$ OF REDUCTION IN POWER TO BE CONSUMED | -1,000 [kWh] |
| MAXIMUM AMOUNT $\Delta t^{max}$ OF CHANGES IN SET TEMPERATURES | 3 [°C] |
| ACQUISITION INTERVAL | 1 [HOUR] |
| AGGREGATION PERIOD | 7 [DAYS] |

FIG. 8

| | AIR-CONDITIONING APPARATUS | | | 70a |
|---|---|---|---|---|
| TIME AND DATE | SET TEMPERATURE $t_{ij}$ [°C] | TEMPERATURE $T_{ij}$ OF OUTSIDE AIR [°C] | CONSUMED POWER $P_{ij}$ [kWh] | |
| 10:00, AUGUST 15, 2012 | 26 | 30 | 540 | |
| 11:00, AUGUST 15, 2012 | 26 | 31 | 560 | |
| ⋮ | ⋮ | ⋮ | ⋮ | |

FIG. 9A

| AREA NUMBER (i) / SITE NUMBER (j) | 1 | 2 | 3 | 4 | 5 | 6 |
|---|---|---|---|---|---|---|
| 1 | -5.0 | -6.2 | -5.1 | -5.5 | -9.1 | -9.9 |
| 2 | -5.3 | -6.3 | -5.0 | -4.6 | -9.0 | -9.0 |
| 3 | -5.0 | -5.4 | -5.6 | -5.0 | -8.1 | -8.7 |
| 4 | -5.6 | -6.4 | -4.5 | -5.6 | -8.6 | -9.3 |
| 5 | -4.1 | -6.6 | -5.0 | -5.0 | -9.2 | -9.1 |
| 6 | -5.9 | -5.1 | -5.0 | -5.3 | -9.3 | -9.9 |
| 7 | -4.4 | -6.3 | -5.0 | -4.7 | -9.9 | -8.1 |
| 8 | -5.0 | -6.3 | -5.0 | -5.6 | -9.1 | -9.9 |
| 9 | -4.7 | -5.7 | -4.1 | -5.0 | -9.0 | -9.0 |
| 10 | -5.0 | -6.0 | -4.4 | -5.6 | -9.1 | -9.0 |
| TOTAL $A_i$ OF COEFFICIENTS | -50.0 | -60.3 | -48.7 | -51.9 | -89.4 | -90.9 |

FIG. 9B

| AREA NUMBER (i) / SITE NUMBER (j) | 1 | 2 | 3 | 4 | 5 | 6 |
|---|---|---|---|---|---|---|
| 1 | 4.1 | 6.0 | 5.6 | 4.3 | 8.7 | 9.9 |
| 2 | 5.0 | 6.3 | 5.0 | 4.6 | 9.7 | 9.0 |
| 3 | 5.6 | 5.4 | 5.6 | 5.0 | 8.6 | 8.7 |
| 4 | 5.3 | 6.3 | 5.5 | 5.9 | 8.6 | 9.3 |
| 5 | 4.7 | 6.0 | 5.3 | 5.0 | 8.1 | 9.9 |
| 6 | 5.9 | 5.8 | 4.8 | 5.6 | 8.8 | 9.3 |
| 7 | 4.4 | 6.3 | 5.0 | 4.7 | 9.9 | 8.1 |
| 8 | 4.7 | 6.1 | 5.2 | 5.6 | 9.4 | 9.4 |
| 9 | 5.0 | 5.7 | 4.4 | 5.0 | 9.6 | 9.0 |
| 10 | 5.3 | 6.2 | 4.5 | 5.3 | 8.1 | 9.0 |
| TOTAL $B_i$ OF COEFFICIENTS | 50.0 | 60.1 | 49.9 | 50.0 | 90.5 | 91.6 |

FIG. 10

| VARIABLE NAME | VALUES [kWh] |
|---|---|
| $\bar{r}_i$ | $\bar{r}_1 = -150.0, \quad \bar{r}_2 = -180.9, \quad \bar{r}_3 = -146.1,$ <br> $\bar{r}_4 = -155.7, \quad \bar{r}_5 = -268.2, \quad \bar{r}_6 = -272.7$ |

FIG. 11A

| SITE NUMBER (j) \ AREA NUMBER (i) | i=1 | i=2 | i=3 | i=4 | i=5 | i=6 |
|---|---|---|---|---|---|---|
| i=1 UTSUNOMIYA CITY | 2.354 | 1.253 | 1.226 | 0.973 | 0.792 | 0.743 |
| 2 MAEBASHI CITY | 1.253 | 1.958 | 1.173 | 0.963 | 0.786 | 0.886 |
| 3 SAKURA-KU, SAITAMA CITY | 1.226 | 1.173 | 1.722 | 1.178 | 1.045 | 0.966 |
| 4 CHIYODA-KU, TOKYO PREFECTURE | 0.973 | 0.963 | 1.178 | 1.562 | 1.058 | 1.170 |
| 5 CHUO-KU, CHIBA CITY | 0.792 | 0.786 | 1.045 | 1.058 | 1.678 | 1.129 |
| 6 NAKA-KU, YOKOHAMA CITY | 0.743 | 0.886 | 0.966 | 1.170 | 1.129 | 1.520 |

FIG. 11B

| SITE NUMBER (j) \ AREA NUMBER (i) | i=1 | i=2 | i=3 | i=4 | i=5 | i=6 |
|---|---|---|---|---|---|---|
| i=1 UTSUNOMIYA CITY | 3.737 | 2.205 | 1.719 | 1.088 | 0.944 | 0.817 |
| i=2 MAEBASHI CITY | 2.205 | 3.139 | 1.173 | 0.963 | 1.260 | 1.208 |
| i=3 SAKURA-KU, SAITAMA CITY | 1.719 | 1.173 | 3.151 | 1.178 | 1.423 | 1.496 |
| i=4 CHIYODA-KU, TOKYO PREFECTURE | 1.088 | 0.963 | 1.178 | 2.249 | 1.211 | 1.330 |
| i=5 CHUO-KU, CHIBA CITY | 0.944 | 1.260 | 1.423 | 1.211 | 1.457 | 0.847 |
| i=6 NAKA-KU, YOKOHAMA CITY | 0.817 | 1.208 | 1.496 | 1.330 | 0.847 | 1.251 |

FIG. 12

| AREA NUMBER (i) | UTILIZATION RATE $y_i$ |
|---|---|
| i=1<br>UTSUNOMIYA CITY | 0.142 |
| i=2<br>MAEBASHI CITY | 0.176 |
| i=3<br>SAKURA-KU, SAITAMA CITY | 0.061 |
| i=4<br>CHIYODA-KU, TOKYO PREFECTURE | 0.128 |
| i=5<br>CHUO-KU, CHIBA CITY | 0.226 |
| i=6<br>NAKA-KU, YOKOHAMA CITY | 0.267 |

FIG. 13

| AREA NUMBER (i) | TARGET AMOUNT OF REDUCTION $R_i^{AC}\ [kWh]$ |
|---|---|
| i=1 UTSUNOMIYA CITY | -142 |
| i=2 MAEBASHI CITY | -176 |
| i=3 SAKURA-KU, SAITAMA CITY | -61 |
| i=4 CHIYODA-KU, TOKYO PREFECTURE | -128 |
| i=5 CHUO-KU, CHIBA CITY | -226 |
| i=6 NAKA-KU, YOKOHAMA CITY | -267 |

FIG. 14

| SELECTION METHOD | STANDARD DEVIATIONS OF AMOUNT OF REDUCTION IN POWER TO BE CONSUMED IN TARGET AREA | |
|---|---|---|
| | FIRST HALF OF JULY, 2012 | SECOND HALF OF JULY, 2012 |
| WORST SELECTION | 1.53 | 1.93 |
| EQUALIZATION SELECTION | 1.07 | 1.26 |
| SELECTION BY OPTIMIZATION | – | 1.18 |

INFORMATION PROCESSING METHOD, PROGRAM DEVELOPMENT DEVICE, RECORDING MEDIUM, AND METHOD

CROSS-REFERENCE TO RELATED APPLICATION

This application is based upon and claims the benefit of priority of the prior Japanese Patent Application No. 2013-080005, filed on Apr. 5, 2013, the entire contents of which are incorporated herein by reference.

FIELD

The embodiment discussed herein is related to an information processing method, a program development device, a recording medium, and a method.

BACKGROUND

In recent years, an intermediate provider that is called a demand response (DR) aggregator is known, which executes control (demand response (DR)) of power to be consumed by users instead of an electric power provider in response to a request to reduce power to be consumed by the users from the electric power provider such as an electric power company or a power product supplier (PPS). As a method for executing the DR by the DR aggregator, there is a method called direct load control (DLC) that is executed to directly control amounts of power to be consumed by apparatuses used by users, for example. The apparatuses to be subjected to the DLC are air-conditioning apparatuses, lighting apparatuses, refrigerating facilities, freezing facilities, in-house generators, and the like, for example. If the DLC is executed on an air-conditioning apparatus in summer, The DR aggregator may increase a set temperature of the air-conditioning apparatus and thereby control the amount of power to be consumed.

As related art, Japanese Laid-open Patent Publications Nos. 2003-87969, 2007-129873, and 2012-23816 have been disclosed, for example.

The DR aggregator sets a target amount of a reduction in power to be consumed in response to a request from an electric power provider before (for example, a day before the execution of the DR) executing the DR. Then, the DR aggregator preferably develops a program for executing the DLC in order to achieve the target amount at a high rate.

SUMMARY

According to an aspect of the invention, an information processing method to be executed by a processor included in a program development device, the information processing method includes setting an area target amount of reduction in power consumption of a target area in which power consumption is to be reduced; acquiring a predicted value and a measured value of outdoor temperature at each of a plurality of subareas included in the target area; calculating, for each of the plurality of subareas, a prediction error of outdoor temperature by calculating a difference between the predicted value and the measured value; calculating, for each of the plurality of subareas, a utilization rate indicating a rate of assignment of the area target amount of reduction in power consumption by solving an objective function generated based on the area target amount of reduction and a variance of the prediction error of outdoor temperature; and determining, for each of the plurality of subareas, a subarea target amounts of reduction in power consumption based on the utilization rate.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of initial setting information;

FIG. 8 is a diagram illustrating an example of a measurement information database;

FIGS. 9A and 9B are diagrams illustrating examples of a coefficient information table;

FIG. 10 is a diagram illustrating an example of averages of maximum reduction amounts $r_i$ calculated by a calculator for areas i;

FIGS. 11A and 11B are diagrams illustrating examples of a table of a variance-covariance matrix $\Sigma$;

FIG. 12 is a diagram illustrating an example of utilization rates $y_i$ of reduction capabilities calculated by a control program developer;

FIG. 13 is a diagram illustrating an example of target amounts $R_i^{AC}$, calculated by the control program developer, of reductions in power to be consumed in the areas;

FIG. 14 is a diagram illustrating examples of a result of calculating a standard deviation of the amount of a reduction in power to be consumed in a target area.

DESCRIPTION OF EMBODIMENT

Hereinafter, an embodiment is described in detail with reference to FIGS. 1 to 15.

Figure 1:
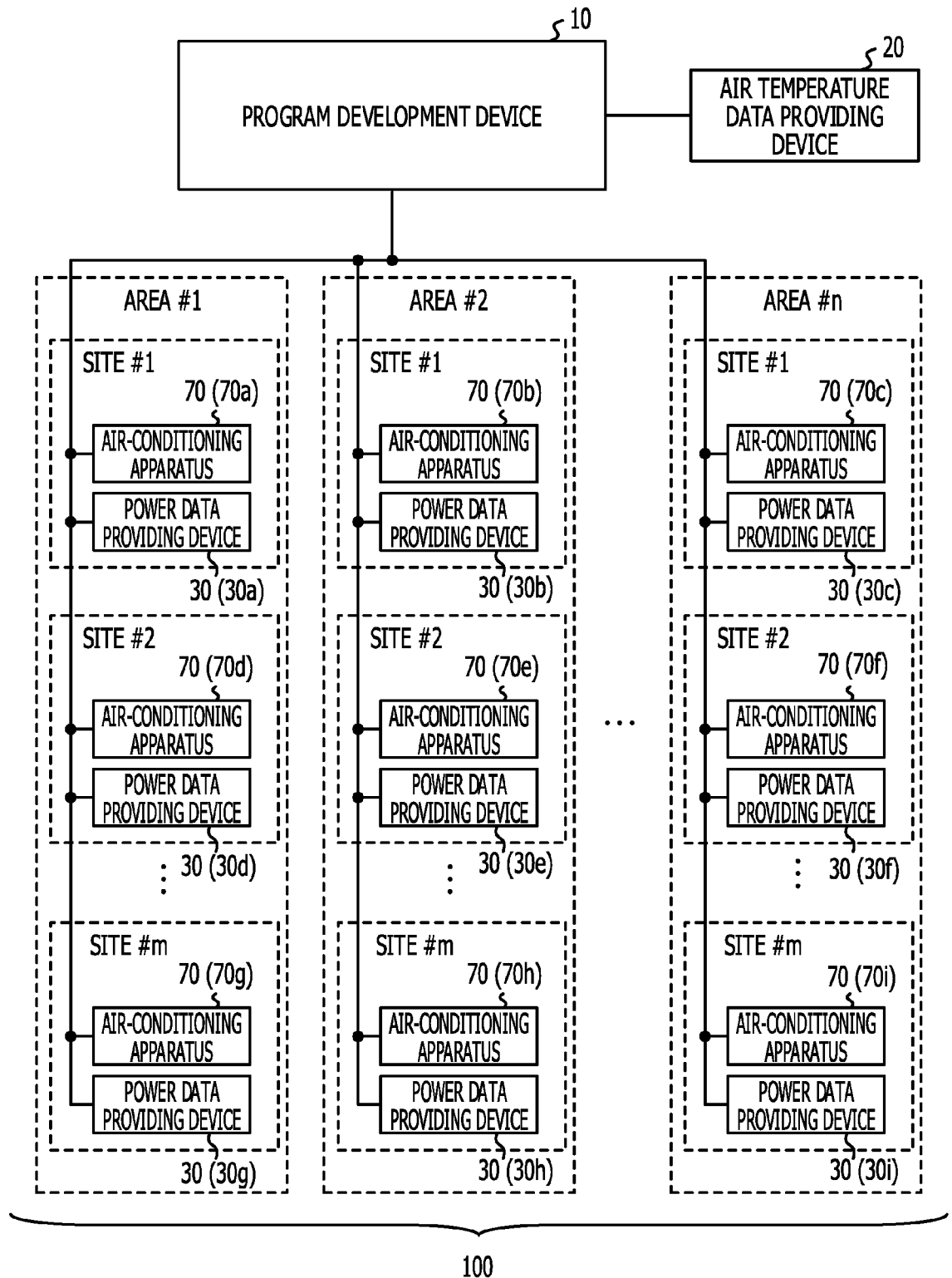
FIG. 1 is a diagram illustrating an example of a program development system.

FIG. 1 is a diagram illustrating an example of a program development system. FIG. 1 illustrates an example in which air-conditioning apparatuses are subjected to DLC. As illustrated in FIG. 1, the program development system includes a program development device 10, an air temperature data providing device 20, power data providing devices 30, and air-conditioning apparatuses 70. The program development device 10, the power data providing devices 30, the air temperature data providing device 20, and the air-conditioning apparatuses 70 are connected to each other through a network such as the Internet and thereby may communicate with each other through the network.

In addition, FIG. 1 illustrates a number n of areas (area #1, area #2, . . . , area #n) that form a target area 100 to be subjected to the DLC. The number n of areas each have a number m of sites (site #1, site #2, . . . , site #m). The sites are, for example, houses, offices, factories, or the like.

The program development device 10 is a device that controls power to be consumed and is owned by an electric power provider (electric power supplier) or a DR aggregator. The program development device 10 develops a program for controlling power based on data of various types. The program development device 10 may execute a process of controlling power for each user based on the developed program for controlling power. The program development device 10 is a computer such as a server, for example. The process to be executed by the program development device 10 is described later.

The air temperature data providing device 20 is a device installed in an institution such as Japan Meteorological Agency or Japan Weather Association, a company, or the like, which forecasts weather and temperatures. The air temperature data providing device 20 may transmit, to the program development device 10, predicted values of temperatures of outside air existing in the areas within the target area 100, measured values of the temperatures of the outside air, and information of times (times and dates) when the temperatures of the outside air are measured. The air temperature data providing device 20 is a computer such as a server, for example.

The power data providing devices 30 are devices that are installed in the sites, respectively, while the number of the sites is n×m. In FIG. 1, power data providing devices 30a, 30b, 30c, 30d, 30e, 30f, 30g, 30h, and 30i are illustrated as an example of the power data providing devices 30. Hereinafter, if the power data providing devices 30a to 30i are not distinguished, the power data providing devices 30a to 30i are referred to as power data providing devices 30. Each of the power data providing devices 30 may provide, to the program development device 10, information of power to be consumed by an air-conditioning apparatus 70 installed in the same site as the power data providing device 30.

The air-conditioning apparatuses 70 are installed in the plurality of sites included in the target area 100. The air-conditioning apparatuses 70 are air conditioners, for example. The air-conditioning apparatuses 70 may each control, through a control device or a control circuit, the temperature of the inside of a certain room in accordance with a set temperature. In FIG. 1, air-conditioning apparatuses 70a, 70b, 70c, 70d, 70e, 70f, 70g, 70h, and 70i are illustrated as an example of the air-conditioning apparatuses 70. For example, the air-conditioning apparatus 70a and the power data providing device 30a are installed in the site #1 within the area #1. In FIG. 1, a single air-conditioning apparatus 70 is illustrated in each of the sites. A plurality of air-conditioning apparatuses 70, however, may be installed in each of the sites. Hereinafter, if the air-conditioning apparatuses 70a to 70i are not distinguished, the air-conditioning apparatuses 70a to 70i are referred to as air-conditioning apparatuses 70.

Next, a hardware configuration of the program development device 10 is described.

Figure 2:
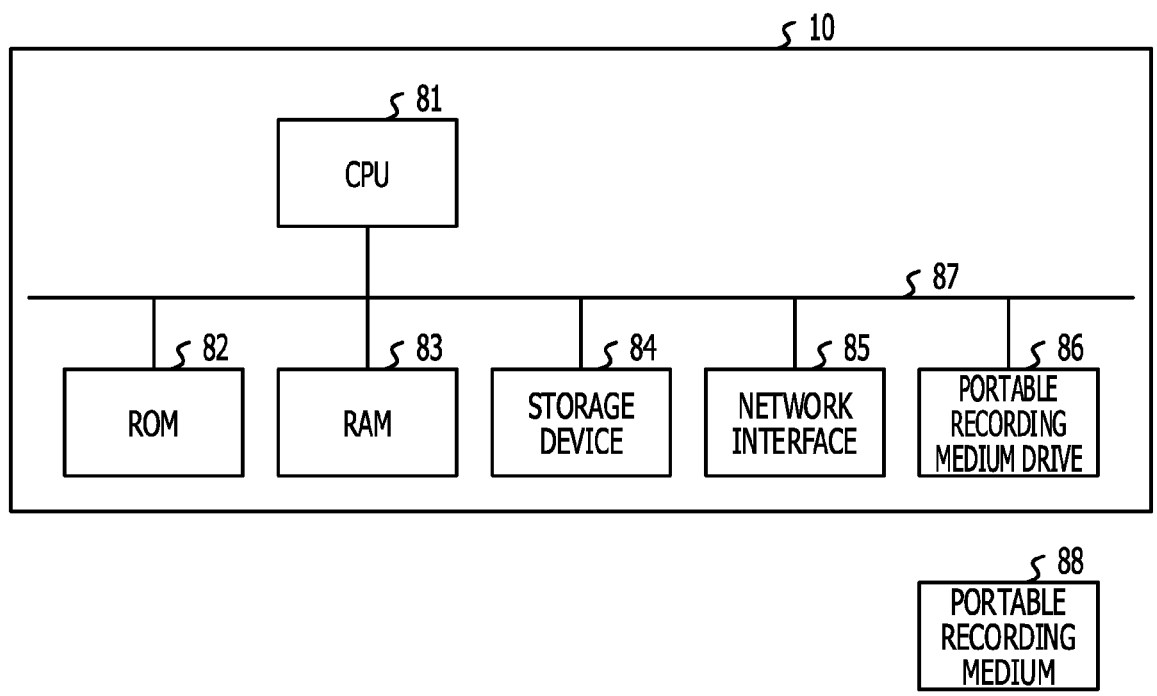
FIG. 2 is a diagram illustrating an example of a hardware configuration of a program development device.

FIG. 2 is a diagram illustrating an example of the hardware configuration of the program development device 10. As illustrated in FIG. 2, the program development device 10 includes a central processing unit (CPU) 81, a read only memory (ROM) 82, a random access memory (RAM) 83, a storage device 84, a network interface 85, and a portable recording medium drive 86.

The constituent units 81 to 86 of the program development device 10 are connected to a bus 87. The storage device 84 is a hard disk drive (HDD), for example. Functions of the program development device 10 are achieved by causing a processor such as the CPU 81 to execute a program stored in the ROM 82 or the storage device 84 or to execute the program read by the portable recording medium drive 86 from a portable recording medium 88.

Next, the functions of the units that form the program development device 10 are described.

Figure 3:
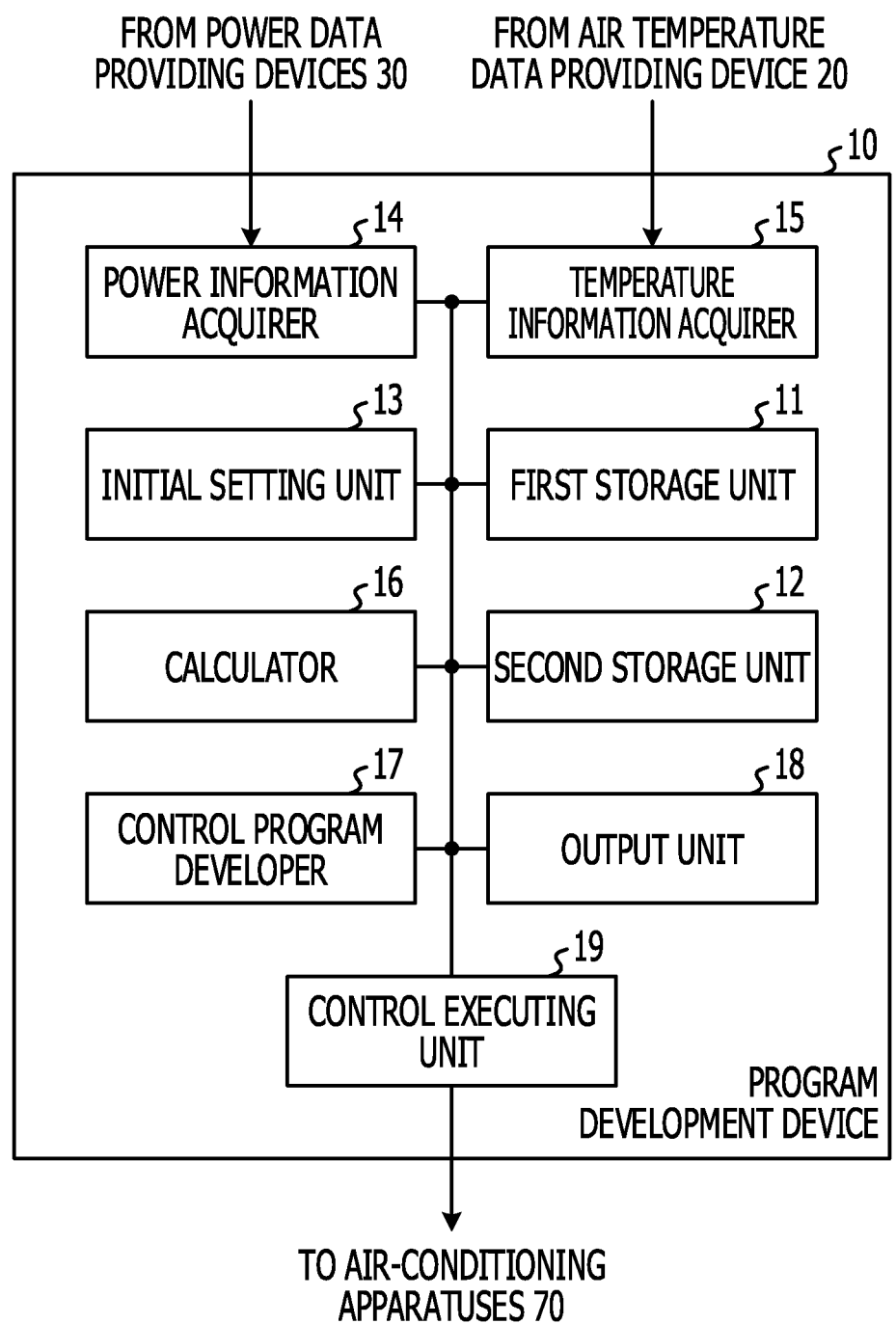
FIG. 3 is a diagram illustrating an example of a configuration of the program development device.

FIG. 3 is a diagram illustrating an example of a configuration of the program development device 10. As illustrated in FIG. 3, the program development device 10 includes a first storage unit 11, a second storage unit 12, an initial setting unit 13, a power information acquirer 14, a temperature information acquirer 15, a calculator 16, a control program developer 17, an output unit 18, and a control executing unit 19.

The first storage unit 11 corresponds to, for example, the ROM 82 (illustrated in FIG. 2), the storage device 84 (illustrated in FIG. 2), the portable recording medium drive 86 (illustrated in FIG. 2), or the portable recording medium 88 (illustrated in FIG. 2). The first storage unit 11 may store a program development program for developing a program for controlling power to be consumed.

The second storage unit 12 corresponds to, for example, the ROM 82 (illustrated in FIG. 2), the RAM 83 (illustrated in FIG. 2), the storage device 84 (illustrated in FIG. 2), the portable recording medium drive 86 (illustrated in FIG. 2), or the portable recording medium 88 (illustrated in FIG. 2). The second storage unit 12 is used as a database (DB) for storing various types of information to be used for the process according to the embodiment.

The initial setting unit 13 sets initial setting information that is used for the process to be executed by the program development device 10. The initial setting information is, for example, information of a target amount $R^{AC}$ of a reduction in power to be consumed in the target area 100, an upper limit $\Delta t^{max}$ of the amounts of changes in set temperatures of the air-conditioning apparatuses 70 for increases in the set temperatures, and the like. The initial setting unit 13 causes the set information to be stored in the second storage unit 12.

The power information acquirer 14 acquires, from the power data providing devices 30, information of power $p_{ij}$ consumed by the air-conditioning apparatuses 70 installed in the sites j (j=1, 2, . . . , m) within the areas i (i=1, 2, . . . , n) and information of times (times and dates) for the acquisition. Then, the power information acquirer 14 causes the acquired information to be stored in a measurement information database included in the second storage unit 12. The power information acquirer 14 is achieved by a processor such as the CPU 81 (illustrated in FIG. 2) or a micro processing unit (MPU) and the network interface 85, for example. The power information acquirer 14 is an example of an acquirer.

The temperature information acquirer 15 acquires, from the air temperature data providing device 20, information of predicted values $T_i'$ (i=1, 2, . . . , n) of the temperatures of the outside air at locations at which the air-conditioning apparatuses 70 are installed, information of measured values $T_i$ of the temperatures of the outside air, and information of times (times and dates) when the temperatures $T_i$ of the outside air are measured. Then, the temperature information acquirer 15 causes the acquired information to be stored in the measurement information database included in the second storage unit 12.

The power information acquirer 14 and the temperature information acquirer 15 are achieved by a processor such as the CPU 81 (illustrated in FIG. 2) or the MPU and the network interface 85, for example. The temperature information acquirer 15 is an example of the acquirer.

The calculator 16 calculates primary coefficients $a_{ij}$ and $b_{ij}$ for each of the air-conditioning apparatuses 70 based on the information of the measurement information database, while the primary coefficients $a_{ij}$ and $b_{ij}$ are included in a linear model indicating power to be consumed by the air-conditioning apparatuses 70 using the temperatures of the outside air and the set temperatures of the air-conditioning apparatuses 70 as parameters. The calculator 16 calculates totals $A^i$ and $B_i$ of coefficients for each of the areas based on the calculated primary coefficients $a_{ij}$ and $b_{ij}$.

The calculator 16 calculates statistic information related to the temperatures of the outside air and to be used for a process of determining a target amount of a reduction in power to be consumed in each of the areas. The calculator 16 calculates prediction errors $\delta T_i$ and a variance-covariance matrix Q of the prediction errors $\delta T_i$ based on the information indicating the predicted values $T_i'$ and measured values $T_i$ of the temperatures of the outside air and acquired by the temperature information acquirer 15 from the air temperature data providing device 20.

The control program developer 17 determines a target amount of a reduction in power to be consumed in each of the number n of areas so that variance, calculated based on the prediction errors $\delta T_i$ (of temperatures of the outside air) calculated by the calculator 16, of the amounts of reductions in power to be consumed in the target area 100 is reduced. The control program developer 17 determines the amounts of changes in the set temperatures of the air-conditioning apparatuses installed in the number n of areas based on the amounts, assigned to the number n of the areas, of the reductions in power to be consumed. The control program developer 17 is an example of a determining unit.

The output unit 18 may output information of the amounts, determined by the control program developer 17, of the changes in the set temperatures of the air-conditioning apparatuses installed in the number n of areas. The output unit 18 may output the set temperatures of the air-conditioning apparatuses after the changes, instead of the information of the amounts of the changes in the set temperatures of the air-conditioning apparatuses. The output unit 18 may output the target amounts, determined by the control program developer 17, of the reductions in power to be consumed in the number n of areas. The output unit 18 is a display device such as a liquid crystal display, a plasma display, or an organic electroluminescent display, for example.

The control executing unit 19 controls the set temperatures based on the amounts, calculated by the control program developer 17, of the changes in the set temperatures of the air-conditioning apparatuses 70. Specifically, the control executing unit 19 transmits, through the network to the air-conditioning apparatuses 70 installed in the sites, an instruction signal indicating an instruction to change, by amounts $\Delta t_{ij}$, the set temperatures of the air-conditioning apparatuses 70 installed in the sites within the target area 100.

The initial setting unit 13, the calculator 16, the control program developer 17, and the control executing unit 19 are achieved by a processor such as the CPU 81 illustrated in FIG. 2 or the MPU, for example.

Next, a method for developing a program by the program development device 10 according to the embodiment is described.

Figure 4:
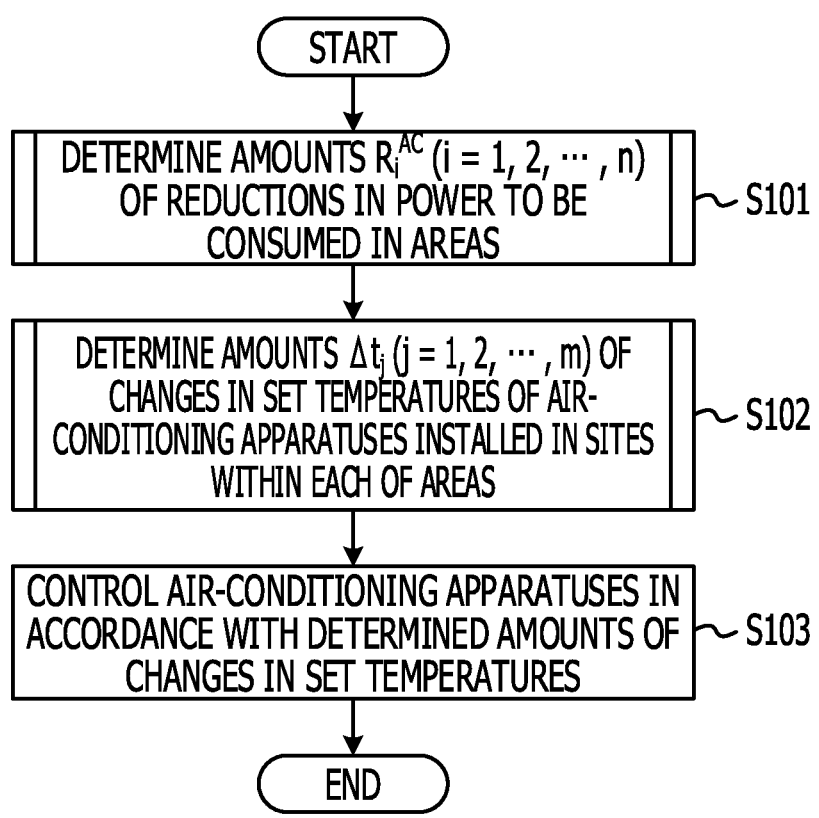
FIG. 4 is a flowchart of an example of a method for developing a program by the program development device.

FIG. 4 is a flowchart of an example of the program development method to be executed by the program development device 10.

First, the program development device 10 determines an amount $R_i^{AC}$ of a reduction in power to be consumed in each of the areas based on the target amounts of the reductions in power to be consumed in order to assign the amounts of the reductions in power to be consumed to the areas (in S101). A process of S101 is described below in detail.

Figure 5:
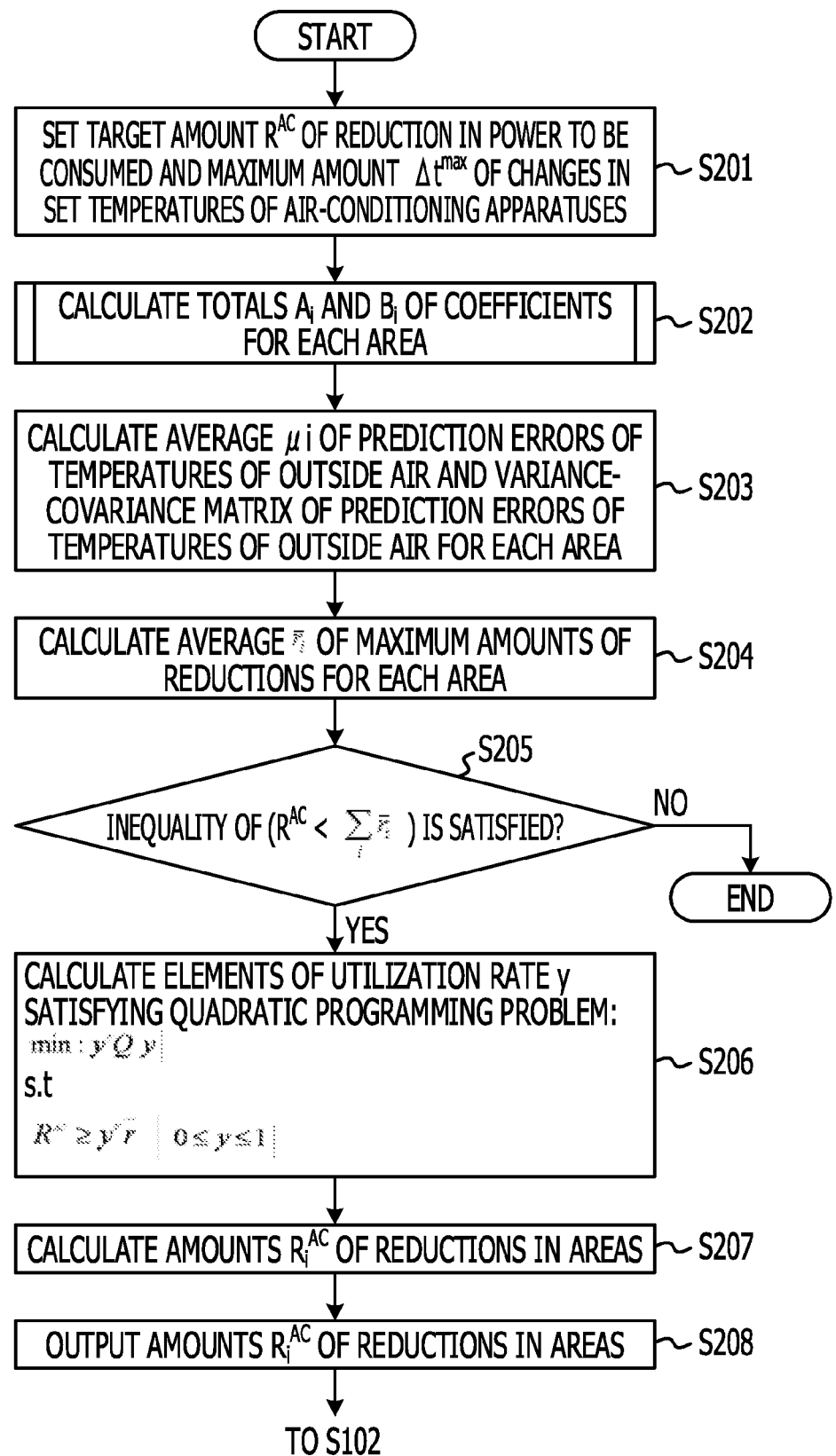
FIG. 5 is a flowchart of an example of a method for determining an amount $R_i^{AC}$ of a reduction in power to be consumed in each of areas in S101.

FIG. 5 is a flowchart of an example of a method for determining an amount $R_i^{AC}$ of a reduction in power to be consumed in each of the areas.

First, the initial setting unit 13 sets a target amount $R^{AC}$ of a reduction in power to be consumed in the overall target area and the maximum amount $\Delta t^{max}$ indicating the upper limit of the amounts of the changes in the set temperatures of the air-conditioning apparatuses 70 (in S201). In S201, the initial setting unit 13 acquires, as initial setting information, information of the amount $R^{AC}$ of the reduction and information of the maximum amount $\Delta t^{max}$ of the changes in the set temperatures from an input device such as a keyboard, a mouse, or a touch panel. Alternatively, the initial setting unit 13 may receive the aforementioned information from another terminal device. The initial setting unit 13 causes the acquired information to be stored in the second storage unit 12.

FIG. 6 is a diagram illustrating an example of the initial setting information. The initial setting information may be updated. When the storage of the initial setting information in the second storage unit 12 is completed, a process of S201 is completed.

Subsequently, the calculator 16 calculates totals $A_i$ and $B_i$ of coefficients for each of the areas i (in S202). A method for calculating the totals $A_i$ and $B_i$ of coefficients is described below.

Figure 7:
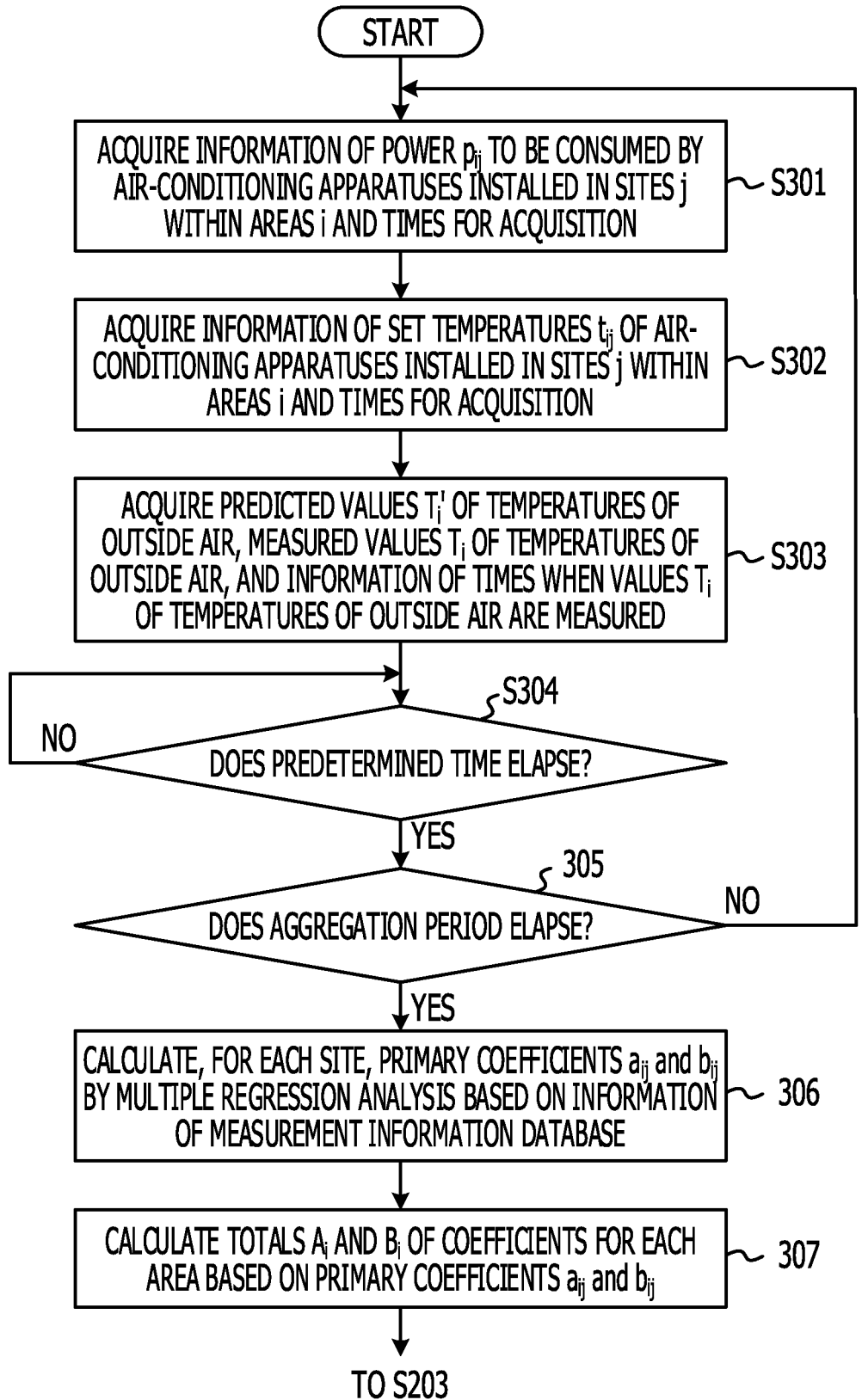
FIG. 7 is a flowchart of a method for calculating totals $A_i$ and $B_i$ of coefficients for each of the areas i in S202.

FIG. 7 is a flowchart of the method for calculating totals $A_i$ and $B_i$ of coefficients for each of the areas i (i=1, 2, ..., n) in S202.

First, the power information acquirer 14 acquires, from the power data providing devices 30, information of power $p_{ij}$ consumed by air-conditioning apparatuses 70 installed in sites j within the areas i and information of times (times and dates) for the acquisition, and the power information acquirer 14 causes the acquired information to be stored in the measurement information database included in the second storage unit 12 (in S301). In this case, the information is acquired from the air-conditioning apparatuses 70 that are operating and consume power that may be controlled by the program development device 10. The operating air-conditioning apparatuses 70 are air-conditioning apparatuses 70 from which information may be acquired. The operating air-conditioning apparatuses 70 include an air-conditioning apparatus 70 of which a power source is in an off state and from which information may be acquired.

Subsequently, the temperature information acquirer 15 acquires, from the air-conditioning apparatuses 70, set temperatures $t_{ij}$ and information of times (times and dates) for the acquisition. Then, the temperature information acquirer 15 causes the acquired information to be stored in the measurement information database included in the second storage unit 12 (in S302).

Subsequently, the temperature information acquirer 15 acquires, from the air temperature data providing device 20, the predicted values $T_i'$ of the temperatures of the outside air at the locations at which the air-conditioning apparatuses 70 are installed, the measured values $T_i$ of the temperatures of the outside air, and the times (times and dates) when the temperatures $T_i$ of the outside air are measured, and the temperature information acquirer 15 causes the acquired information to be stored in the measurement information database included in the second storage unit 12 (in S303).

FIG. 8 is a diagram illustrating an example of the measurement information database. As illustrated in FIG. 8, the second storage unit 12 has stored therein, for each of the times when the information is measured, information of the set temperatures $t_{ij}$, information of the temperatures $T_i$ of the outside air, and information of the power $p_{ij}$ consumed, while the information of the set temperatures $t_{ij}$, the information of the temperatures $T_i$ of the outside air, and the information of the power $p_{ij}$ consumed are associated with each other for each of the times when the information is measured.

Returning to FIG. 7, after a process of S303, the power information acquirer 14 and the temperature information acquirer 15 determine whether or not a predetermined time elapses (in S304). In this case, the "predetermined time" is a time interval (of, for example, one hour) in which data set as the initial setting information in advance is acquired. If the power information acquirer 14 and the temperature information acquirer 15 determine that the predetermined time does not elapse (No in S304), the power information acquirer 14 and the temperature information acquirer 15 repeat a process of S304. On the other hand, if the power information acquirer 14 and the temperature information acquirer 15 determine that the predetermined time elapses (Yes in S304), the process proceeds to S305.

In S305, the calculator 16 determines whether or not an aggregation period elapses. The aggregation period is a time period (of, for example, seven days) in which information acquired in order to calculate the totals $A_i$ and $B_i$ of the coefficients is aggregated. If the calculator 16 determines that the aggregation period does not elapse (No in S305), the process returns to S301, and the processes of S301 and later are executed again to continue to accumulate information in the measurement information database illustrated in FIG. 8. On the other hand, if the calculator 16 determines that the aggregation period elapses (Yes in S305), the calculator 16 calculates, based on the information of the measurement information database, primary coefficients $a_{ij}$ and $b_{ij}$ for each of the sites according to Equation (1) using multiple regression analysis (in S306).

$$p_{ij} = a_{ij} t_{ij} + b_{ij} T_{ij} + c_{ij} + \text{err} \qquad \text{Equation (1)}$$

(i=1, 2, . . . , n−1, n)
(j=1, 2, . . . , m−1, m)

Equation (1) is a linear model expressed by using the temperatures $T_{ij}$ of the outside air and the set temperatures $t_{ij}$ as explanatory variables and using consumed power $p_{ij}$ as an explained variable. In the embodiment, while there are strong correlations between the power $p_{ij}$ consumed by the air-conditioning apparatuses 70 and the set temperatures $t_{ij}$ and the temperatures $T_i$ of the outside air, the linear model of Equation (1) is used. A symbol $a_{ij}$ of the first term and a symbol $b_{ij}$ of the second term indicate coefficients that are different depending on the sites and expressed in Wh (watt-hour) by being multiplied by temperature parameters. A symbol $C_{ij}$ of the third term is an invariable term, while a symbol err of the fourth term is an error term. Symbols n and m are natural numbers. The symbol n indicates the total number of the areas, while the symbol m indicates the total number of the sites. The calculator 16 causes information of the primary coefficients $a_{ij}$ and $b_{ij}$ calculated using the multiple regression analysis to be stored in a coefficient information table included in the second storage unit 12.

Subsequently, the calculator 16 calculates totals $A_i$ and $B_i$ of coefficients for each of the areas based on the primary coefficients $a_{ij}$ and $b_{ij}$ calculated in S306 (in S307). The total $A_i$ of coefficients for each of the areas i may be calculated by calculating the total of the primary coefficients $a_{ij}$ calculated for the sites j within each of the areas i as indicated by Equation (2).

$$A_i = \sum_j a_{ij} \qquad \text{Equation (2)}$$

$(i = 1, 2, \ldots, n-1, n)$ $(j = 1, 2, \ldots, m-1, m)$

The total $B_i$ of coefficients for each of the areas i may be calculated by calculating the total of the primary coefficients $b_{ij}$ calculated for the sites j within each of the areas i as indicated by Equation (3).

$$B_i = \sum_j b_{ij} \qquad \text{Equation (3)}$$

$(i = 1, 2, \ldots, n-1, n)$ $(j = 1, 2, \ldots, m-1, m)$

Then, the calculator 16 causes information of the calculated totals $A_i$ and $B_i$ of coefficients for the areas i to be stored in the coefficient information table included in the second storage unit 12.

FIGS. 9A and 9B are diagrams illustrating examples of the coefficient information table. FIG. 9A illustrates a coefficient information table for the primary coefficients $a_{ij}$ and the totals $A_i$ of the coefficients $a_{ij}$. FIG. 9B illustrates a coefficient information table for the primary coefficients $b_{ij}$ and the totals $B_i$ of the coefficients $b_{ij}$. As illustrated in FIGS. 9A and 9B, information of the primary coefficients $a_{ij}$ and $b_{ij}$ and the totals $A_i$ and $B_i$ of the coefficients, area numbers (i), and site numbers (j) are stored in the coefficient information tables, while the information of the primary coefficients $a_{ij}$ and $b_{ij}$ and the totals $A_i$ and $B_i$ of the coefficients is associated with the area numbers (i) and the site numbers (j). The area numbers (i) are identifiers identifying the areas, while the site numbers (j) are identifiers identifying the sites. For example, the area numbers (i) correspond to the areas #1 to #n illustrated in FIG. 1, while the site numbers (j) correspond to the sites #1 to #m illustrated in FIG. 1.

For example, for a primary coefficient $a_{23}$, i=2, j=3, and thus $a_{23}$=−5.4 as illustrated in FIG. 9A. The total $A_1$ of coefficients for an area number 1 is −50.0 as illustrated in FIG. 9A. The value $A_1$ is calculated by summing elements for i=1 using Equation (2). Specifically, $A_1$=−5.0−5.3−5.0−5.6-4.1−5.9−4.4−5.0−4.7−5.0=−50.0.

For example, for a primary coefficient $b_{45}$, i=4, j=5, and thus $b_{45}$=5.0 as illustrated in FIG. 9B. The total $B_1$ of coefficients for the area number 1 is 50.0 as illustrated in FIG. 9B. The value $B_1$ is calculated by summing elements for j=1 using Equation (3). Specifically, $B_1$=4.1+5.0+5.6+5.3+4.7+5.9+4.4+4.7+5.0+5.3=50.0.

A process of S307 may be executed in the aforementioned manner.

After the process of S307, the process returns to the process illustrated in FIG. 5. Subsequently, the calculator 16 calculates an average $\mu_i$ of prediction errors $\delta T_i$ of the temperatures of the outside air and a variance-covariance Q of random variables $B_i \delta T_i$ (i=1, 2, ..., n) for each of the areas (in S203). In S203, the calculator 16 calculates the prediction errors $\delta T_i$ according to the following Equation (4) based on information stored in the measurement information database illustrated in FIG. 8 and indicating the predicted values $T_i'$ of the temperatures of the outside air and information stored in the measurement information database illustrated in FIG. 8 and indicating the measured values $T_i$ of the temperatures of the outside air.

$$\delta T_i = T_i' - T_i \qquad \text{Equation (4)}$$

(i=1, 2, ..., n-1, n)

The calculator 16 may calculate data of a plurality of prediction errors $\delta T_i$ for a single area using information of values $T_i'$ and $T_i$ measured at the acquisition intervals in S303 illustrated in FIG. 7.

Subsequently, the calculator 16 uses the calculated prediction errors $\delta T_i$ to calculate the average $\mu_i$ of the prediction errors $\delta T_i$ of the temperatures of the outside air and a variance-covariance matrix Q of random variables $B_i \delta T_i$ (i=1, 2, ..., n) for each of the areas according to the following Equation (5). The variance-covariance matrix Q may be expressed by the following Equation (5).

$$Q = \begin{pmatrix} B_1 B_1 \sigma_{11} & \cdots & B_1 B_n \sigma_{1n} \\ \vdots & \ddots & \vdots \\ B_n B_1 \sigma_{n1} & \cdots & B_n B_1 \sigma_{nn} \end{pmatrix} \qquad \text{Equation (5)}$$

In Equation (5), $B_i$ (i=1, 2, ..., n) indicates the totals $B_i$, calculated in S202, of coefficients for the areas i. Diagonal elements $\sigma_{ii}$ (i=1, 2, ..., n) indicate variance of the prediction errors $\delta T_i$ of the areas i. Non-diagonal elements $\sigma_{ij}$ (i=1, 2, ..., n, j=1, 2, ..., m) indicate covariance between the prediction errors $\delta T_i$ of the areas i and prediction errors $\delta T_j$ of the areas j. The calculator 16 causes information of the averages $\mu_i$ of the prediction errors $\delta T_i$ calculated for the areas and information of the variance-covariance matrixes Q calculated for the areas to be stored in the second storage unit 12 and terminates a process of S203.

Subsequently, the calculator 16 calculates, for each of the areas, an average maximum reduction amount that indicates an average of amounts of reductions in power to be consumed in the area (in S204), while the average maximum reduction amount may be reduced by controlling amounts of changes in the set temperatures of the air-conditioning apparatuses 70 installed in the areas i (i=1, 2, ..., n) and thereby causing the controlled amounts to be maximal. In S204, the calculator 16 reads information stored in the second storage unit 12 and indicating the totals $A_i$ and $B_i$ of the coefficients for the areas i (i=1, 2, ..., n). Then, the calculator 16 uses the read information of the totals $A_i$ and $B_i$ of the coefficients to calculate an average maximum reduction amount $\bar{r}_i$ ($\bar{r}_i$<0) for each of the areas. The average maximum reduction amount $\bar{r}_i$ may be described by Linear Equation (6) using $\Delta t^{max}$ and $\mu_i$.

$$\bar{r}_i = A_i \Delta t^{max} + B_i \mu_i \qquad \text{Equation (6)}$$

(i=1, 2, ..., n-1, n)

A reason for establishing Equation (6) is described below. Values $r_i$ that indicate predicted amounts of reductions in power to be consumed in the areas i (i=1, 2, ..., n) are affected by the prediction errors $\delta T_i$ of the temperatures of the outside air. Thus, the values $r_i$ are random variables, and a distribution of the values $r_i$ confirms to a normal distribution expressed by Formula (7).

$$r_i \sim N(\bar{r}_i, \sigma_{Bi}^2) \qquad \text{Formula (7)}$$

(i=1, 2, ..., n-1, n)

In Formula (7), $\bar{r}_i$ is the average of the predicted amounts $r_i$, and $\sigma_{Bi}^2$ is the variance of the predicted amounts $r_i$.

The average of the predicted amounts $r_i$ of the reductions in power to be consumed in the areas i (i=1, 2, ..., n) and the variance of the predicted amounts $r_i$ are expressed by the following Equations (8) and (9), respectively.

$$\bar{r}_i = A_i \Delta t^{max} + B_i \mu_i \qquad \text{Equation (8)}$$

(i=1, 2, ..., n-1, n)

$$\sigma_{Bi}^2 = B_i^2 \sigma_i^2 \qquad \text{Equation (9)}$$

(i=1, 2, ..., n-1, n)

A variable $\delta T_i$ is a random variable and may be expressed by Formula (10) using the aforementioned $\mu_i$ and $\sigma_i$.

$$\delta T_i \sim N(\mu_i, \sigma_i^2) \qquad \text{Formula (10)}$$

(i=1, 2, ..., n-1, n)

FIG. 10 is a diagram illustrating averages, calculated by the calculator 16, of predicted amounts of reductions in power to be consumed in the areas i. If a systematic error of a prediction of the temperatures of the outside air does not occur, the averages $\mu_i$ of the prediction errors $\delta T_i$ are nearly equal to 0 in many cases. When $\mu_i$ of Equation (8) is 0, and the maximum amount $\Delta t^{max}$ illustrated in FIG. 6 and the information of the totals $A_i$ and $B_i$ (illustrated in FIGS. 9A and 9B) of the coefficients for the areas i are substituted into Equation (8), the averages of the predicted amounts $r_i$ of the reductions in power to be consumed in the areas i (i=1, 2, ..., 6) may be calculated to be the values illustrated in FIG. 10.

Subsequently, the control program developer 17 determines whether or not the total of the averages of the predicted amounts $r_i$ ($r_i$<0) of reductions in power to be consumed in the areas i is equal to or smaller than the target amount $R^{AC}$ ($R^{AC}$<0) of the reduction in power to be consumed or whether or not the following Formula (11) is satisfied (in S205).

$$R^{AC} \geq \sum_i \bar{r}_i \qquad \text{Formula (11)}$$

(i = 1, 2, ..., n-1, n)

If the control program developer 17 determines that the total of the averages of the maximum amounts $r_i$ of the reductions in the areas i is equal to or smaller than the target amount $R^{AC}$ of the reduction in power to be consumed in the target area 100 (Yes in S205), the control program developer 17 determines that the target amount $R^{AC}$ of the reduction in the target area 100 is achieved by changing the set temperatures of the air-conditioning apparatuses 70, and the process proceeds to S206. On the other hand, if the control program developer 17 determines that the total of the averages of the maximum amounts $r_i$ of the reductions in the areas i is larger than the target amount $R^{AC}$ of the reduction in power to be consumed in the target area 100 (No in S205), the control program developer 17 determines that the target amount $R^{AC}$ of the reduction in the target area 100 is not achieved by changing the set temperatures of the air-conditioning apparatuses 70, and the control program developer 17 terminates the process.

For example, when the values illustrated in FIG. 10 are used, the total of the maximum amounts $r_i$ of the reductions in power to be consumed in the areas i (i=1, 2, . . . , 6) is calculated to be a value as expressed by Equation 12)

$$\sum_{i=1}^{6} \bar{r}_i = -150.0 - 180.9 - 146.1 - \qquad \text{Equation (12)}$$
$$155.7 - 268.2 - 272.7$$
$$= -1173.6 [\text{kWh}]$$

As illustrated in FIG. 6, when the target amount $R^{AC}$ of the reduction in power to be consumed in the target area 100 is set to −1000 kWh, −1000 kWh>−1173.6 kWh and thus the control program developer 17 determines that the answer to S205 is affirmative (Yes).

Next, a process of S206 is described. In order to increase a probability of achieving the target amount of the reduction in power to be consumed in the target area 100, it is preferable that the variation (variance) in the amounts of reductions in power to be consumed in the target area 100 be as small as possible. Thus, the control program developer 17 develops a program for controlling the air-conditioning apparatuses 70 so that the variance of the amounts of the reductions in power to be consumed in the target area 100 is reduced.

For the development of the program, an average maximum reduction amount calculated for each of the areas according to Equation (6) is considered to be a capability of reducing power in each of the areas, and rates of utilizing the capabilities for the program to be developed are expressed by $y_i$. When the target amounts of the reductions in power to be consumed in the areas i are expressed by $R_i^{AC}$, relationships between the target amounts $R_i^{AC}$ and the rates $y_i$ may be expressed by the following Equation (13).

$$R_i^{AC} = y_i \bar{r}_i, 0 \le y_i \le 1 \; (i=1,2,\ldots,n-1,n) \qquad \text{Equation (13)}$$

When a matrix that includes the rates $y_i$ (i=1, 2, . . . , n) as elements is a matrix $y$, the matrix $y$ may be expressed by the following Equation (14). The elements $y_i$ (i=1, 2, . . . , n) of the matrix $y$ indicate the rates of the utilization of the capabilities of reducing power in the areas i. Hereinafter, the matrix $y$ and the elements $y_i$ of the matrix $y$ are referred to as utilization rates.

$$y = \begin{pmatrix} y_1 \\ y_2 \\ \vdots \\ y_{n-1} \\ y_n \end{pmatrix} \qquad \text{Equation (14)}$$

A matrix that includes, as elements, average maximum reduction amounts that are the averages of the predicted amounts $r_i$ (i=1, 2, . . . , n) of the reductions in power to be consumed in the areas within the target area 100 may be expressed by the following Equation (15).

$$\bar{r} = \begin{pmatrix} \bar{r}_1 \\ \bar{r}_2 \\ \vdots \\ \bar{r}_{n-1} \\ \bar{r}_n \end{pmatrix} \qquad \text{Equation (15)}$$

The control program developer 17 calculates the elements $y_1, y_2, \ldots, y_{n-1}, y_n$ of the utilization rate $y$ so that the variance of the amounts of the reductions in power to be consumed in the target area 100 is reduced (in S206). In S206, the control program developer 17 uses a solver for quadratic programming to calculate a solution to a quadratic programming problem indicated by Formula (16) used as an objective function and Formulas (17) and (18) used as constraints. Thus, the control program developer 17 may calculate values of the elements of the utilization rate $y$.

$$\min : y^T Q y \qquad \text{Formula (16)}$$

$$R^{AC} \ge y^T \bar{r} \qquad \text{Formula (17)}$$

$$0 \le y \le 1 \qquad \text{Formula (18)}$$

Formula (16) is the objective function for solving the values of the elements of the utilization rate $y_i$ while the elements cause the variance of the amounts of reductions in power to be consumed in the target area 100 to be reduced. A symbol $y^T$ is a transpose of $y$. The matrix $Q$ may be separated into a matrix $B$ and a matrix $\Sigma$ as indicated by Equation (19) when Equation (5) is deformed.

$$Q = \begin{pmatrix} B_1 B_1 \sigma_{11} & \cdots & B_1 B_n \sigma_{1n} \\ \vdots & \ddots & \vdots \\ B_n B_1 \sigma_{n1} & \cdots & B_n B_1 \sigma_{nn} \end{pmatrix} \qquad \text{Equation (19)}$$
$$= \begin{pmatrix} B_1 B_1 & \cdots & B_1 B_n \\ \vdots & \ddots & \vdots \\ B_n B_1 & \cdots & B_n B_n \end{pmatrix} \cdot \begin{pmatrix} \sigma_{11} & \cdots & \sigma_{1n} \\ \vdots & \ddots & \vdots \\ \sigma_{n1} & \cdots & \sigma_{nn} \end{pmatrix} = B \cdot E$$

In Equation (19), "∘" is a Hadamard product (product of each pair of corresponding elements of the matrixes). Since the matrix B is invariable, it is apparent that the objective function of Equation (19) depends on the matrix $\Sigma$ that is the variance-covariance matrix of the prediction errors $\delta T_i$ of the temperatures of the outside air. By setting the objective function using the variance-covariance matrix $\Sigma$, the values of the elements of the utilization rate $y$ are obtained and minimize not only an effect of the variance of the amounts of the reductions in power to be consumed in the areas forming the target area 100 on the amounts of the reductions in power to be consumed but also an effect of covariance between different areas on the amounts of the reductions in power to be consumed.

Formula (17) is a constraint indicating that a product of the matrix $y^T$ and a matrix including the averages of the predicted amounts of the reductions as the elements is equal to or smaller than the target amount $R^{AC}$ of the reduction in power to be consumed in the target area 100. Specifically, Formula (17) indicates that a value obtained by summing the target amounts of the reductions in power to be consumed in the areas i (i=1, 2, . . . , n) is equal to or smaller than the target amount $R^{AC}$ of the reduction in power to be consumed, while the target amounts of the reductions in power to be consumed in the areas are calculated by multiplying the utilization rates of the areas by the average maximum reduction amounts of the areas. Formula (18) is a constraint indicating that the elements $y_i$ (i=1, 2, . . . , n) of the utilization rate y are positive numbers of 1 or less or zero.

FIGS. 11A and 11B are diagrams illustrating examples of a table of the variance-covariance matrix $\Sigma$. FIGS. 11A and 11B indicate that variance-covariance matrixes $\Sigma$ calculated based on predicted values of temperatures of outside air in six cities located in Kanto area of Japan and measured values of the temperatures of the outside air in the six cities are expressed as tables. FIG. 11A indicates results calculated using data of the first half of July, 2012, while FIG. 11B indicates results calculated using data of the second half of July, 2012. In the coefficient information tables illustrated in FIGS. 9A and 9B, the area number 1 corresponds to "Utsunomiya City", an area number 2 corresponds to "Maebashi City", an area number 3 corresponds to "Sakura-ku, Saitama City", an area number 4 corresponds to "Chiyoda-ku, Tokyo Prefecture", an area number 5 corresponds to "Chuo-ku, Chiba City", and an area number 6 corresponds to "Naka-ku, Yokohama City".

For example, the control program developer 17 uses the variance-covariance matrix $\Sigma$ illustrated in FIG. 11A and the information of the totals $B_i$ (illustrated in FIG. 9B) of the coefficients to calculate the matrix Q from Equation (5). Then, the control program developer 17 uses the calculated matrix Q to solve the quadratic programming problem indicated by Formulas (16) to (18). Thus, the control program developer 17 may calculate utilization rates $y_i$ (i=1, 2, . . . , 6) of the six cities.

In this calculation example, for simplification, it is assumed that predicted models, indicated by Equation (8), of the amounts of the reductions in power to be consumed in the areas are equal to each other, Bi=1 (i=1, 2, . . . , 6), and the constraint of Formula (17) is not used for the calculation example. Based on this assumption, since all the capabilities of reducing power to be consumed in the areas are equal, the utilization rates may be treated as rates of assignments of the target amounts of reductions to the areas. In general, however, the capabilities of reducing power to be consumed are normally different from each other.

FIG. 12 is a diagram illustrating an example of the utilization rates $y_i$ of the reduction capabilities calculated by the control program developer 17. As illustrated in FIG. 12, the utilization rates $y_i$ are different depending on the areas. An utilization rate (assignment rate) of an area in which the amount of a reduction in power to be consumed is easily affected by a prediction error $\delta T_i$ of the temperature of outside air is calculated to be lower than an utilization rate (assignment rate) of an area in which the amount of a reduction in power to be consumed is not easily affected by a prediction error $\delta T_i$ of the temperature of outside air. As illustrated in FIG. 12, it is apparent that since "Naka-ku, Yokohama City" is an area in which the amount of a reduction in power to be consumed is least affected by a prediction error $\delta T_i$ of the temperature of outside air, a high utilization rate (assignment rate) $y_i$ is calculated for "Naka-ku, Yokohama City". In addition, it is apparent that since "Sakura-ku, Saitama City" is an area in which the amount of a reduction in power to be consumed is most easily affected by a prediction error $\delta T_i$ of the temperature of outside air, a low utilization rate (assignment rate) $y_i$ is calculated for "Sakura-ku, Saitama City".

Subsequently, the control program developer 17 uses values of the elements $y_i$ (i=1, 2, . . . , n), calculated in S206, of the utilization rate y to calculate the amounts $R_i^{AC}$ (i=1, 2, . . . , n) of the reductions in power to be consumed in the areas (in S207). The amount $R_i^{AC}$ of a reduction in power to be consumed in each of the areas may be expressed by Equation (20) if Equation (13) is reused.

$$R_i^{AC} = y_i \bar{r}_i \qquad \text{Equation (20)}$$

(i=1, 2, . . . , n−1, n)

The control program developer 17 substitutes the averages of the values $r_i$ calculated in S204 and the utilization rates $y_i$ calculated in S206 into Equation (20) to calculate a target amount $R_i^{AC}$ (i=1, 2, . . . , n) of a reduction in power to be consumed in each of the areas. Then, the control program developer 17 causes the calculated target amounts $R_i^{AC}$ of the reductions in power to be consumed in the areas to be stored in the coefficient information table included in the second storage unit 12.

FIG. 13 is a diagram illustrating an example of the target amounts $R_i^{AC}$, calculated by the control program developer 17, of the reductions in power to be consumed in the areas. As illustrated in FIG. 13, the control program developer 17 may calculate the target amounts $R_i^{AC}$ of the reductions in power to be consumed in the areas on an area basis, based on the utilization rates $y_i$ calculated in S206.

Subsequently, the output unit 18 outputs the target amounts $R_i^{AC}$, calculated in S207, of the reductions in power to be consumed in the areas (in S208).

In the aforementioned manner, the target amounts $R_i^{AC}$ of the reductions in power to be consumed in the areas may be determined.

FIG. 14 is a diagram illustrating examples of a standard deviation of the amount of a reduction in power to be consumed in the target area 100. According to Formula (16), since the variance of the amounts of the reductions in power to be consumed in the target area 100 is expressed by $y^T Q y$, the standard deviation of the amount of the reduction in power to be consumed may be obtained by calculating a positive square root of $y^T Q y$.

An item for "worst selection" indicates standard deviations when "Utsunomiya City" that causes the largest variance of prediction errors $\delta T_i$ of the temperatures of the outside air is selected and the amount of a reduction in power to be consumed is assigned only to "Utsunomiya City". Referring to a diagonal element $a_{11}$ illustrated in FIG. 11A, a value of the variance in "Utsunomiya City" in the first half of July, 2012 is $a_{11}$=2.3454. A standard deviation in the first half of July, 2012 is calculated to be 1.53. A standard deviation in the second half of July, 2012 may be calculated using data illustrated in FIG. 11B in the same manner.

An item for "equalization selection" indicates standard deviations when the amounts of reductions in power to be consumed are equally assigned to the six cities without consideration of variance of prediction errors $\delta T_i$ of the temperatures of the outside air. When the amounts of reductions in power to be consumed are equally assigned to the six cities, the utilization rates (that are also assignment rates in this example) $y_i$ (i=1, 2, . . . , 6) are ⅙. When the quadratic programming problem indicated by Formulas (16) to (19) is solved using this value of ⅙ and the variance-covariance matrix $\Sigma$ illustrated in FIG. 11A, a standard deviation of the amount of a reduction in the first half of July, 2012 is calculated to be 1.07. A standard deviation of the amount of a reduction in the second half of July, 2012 may be calculated using the data illustrated in FIG. 11B in the same manner.

An item for "selection by optimization" indicates a standard deviation of the amount of a reduction in power to be consumed when the amounts of the reductions in power to be consumed are assigned to the six cities using a method according to the embodiment. In the method, the standard deviation is calculated by calculating the utilization rates $y_i$ (i=1, 2, . . . , 6) using the variance-covariance matrix $\Sigma$ of the prediction errors in the second half of July, 2012, and by optimizing the assignment of the amounts of the reductions in the second half of July, 2012 using the calculated utilization rates $y_i$ (i=1, 2, . . . , 6). This calculation method is executed on the premise that a value of the variance-covariance matrix $\Sigma$ of the prediction errors in the second half of July 2012 does not significantly change from a value of the variance-covariance matrix $\Sigma$ of the prediction errors in the first half of July 2012.

As illustrated in FIG. 14, it is apparent that the standard deviation obtained by the method to be executed in accordance with the "selection by optimization" is improved by 38.9% ($\cong$((1.93−1.18)/1.93)×100), compared with the method to be executed in accordance with the "worst selection". In addition, it is apparent that the standard deviation obtained by the method to be executed in accordance with the "selection by optimization" is improved by 6.4% ($\cong$(1.26−1.18)/1.26)×100), compared with the method to be executed in accordance with the "equalization selection".

In the process of S101, a predicted value of the temperature of outside air in each of the plurality of areas within the target area 100 and a measured value of the temperature of outside air in each of the plurality of areas are obtained. Then, prediction errors of the temperatures of the outside air are calculated based on differences between the predicted values and measured values of the temperatures of the outside air, and the target amounts of the reductions in power to be consumed in the areas are determined so that the variance, calculated based on a normal distribution of the prediction errors of the temperatures of the outside air, of the amounts of the reductions in power to be consumed in the target area 100 is reduced. According to the method, the variance of the prediction errors of the temperatures of the outside air in the areas is considered when the target amounts $R_i^{AC}$ of the reductions are assigned to the areas. It is, therefore, possible to suppress a significant deviation, caused by prediction errors of the temperatures of the outside air, of the actual amount of a reduction in power to be consumed in the target area 100 from a planned amount of a reduction. As a result, a risk that a target amount of a reduction in power to be consumed is not achieved due to the prediction errors of the temperatures of the outside air is minimized, and the target amount of a reduction in power to be consumed may be achieved with a high probability.

Returning to FIG. 4, after the process of S101, the program development device 10 determines the amounts of the changes in the set temperatures of the air-conditioning apparatuses 70 installed in the sites within the areas based on the amounts, assigned to the areas, of the reductions in power to be consumed (in S102). In order to reduce power to be consumed, it is preferable that the set temperatures of the air-conditioning apparatuses are changed to higher temperatures. Thus, the amounts of the changes in the set temperatures are the amounts of increases in the set temperatures of the air-conditioning apparatuses. An example of a process of S102 is described below.

Figure 15:
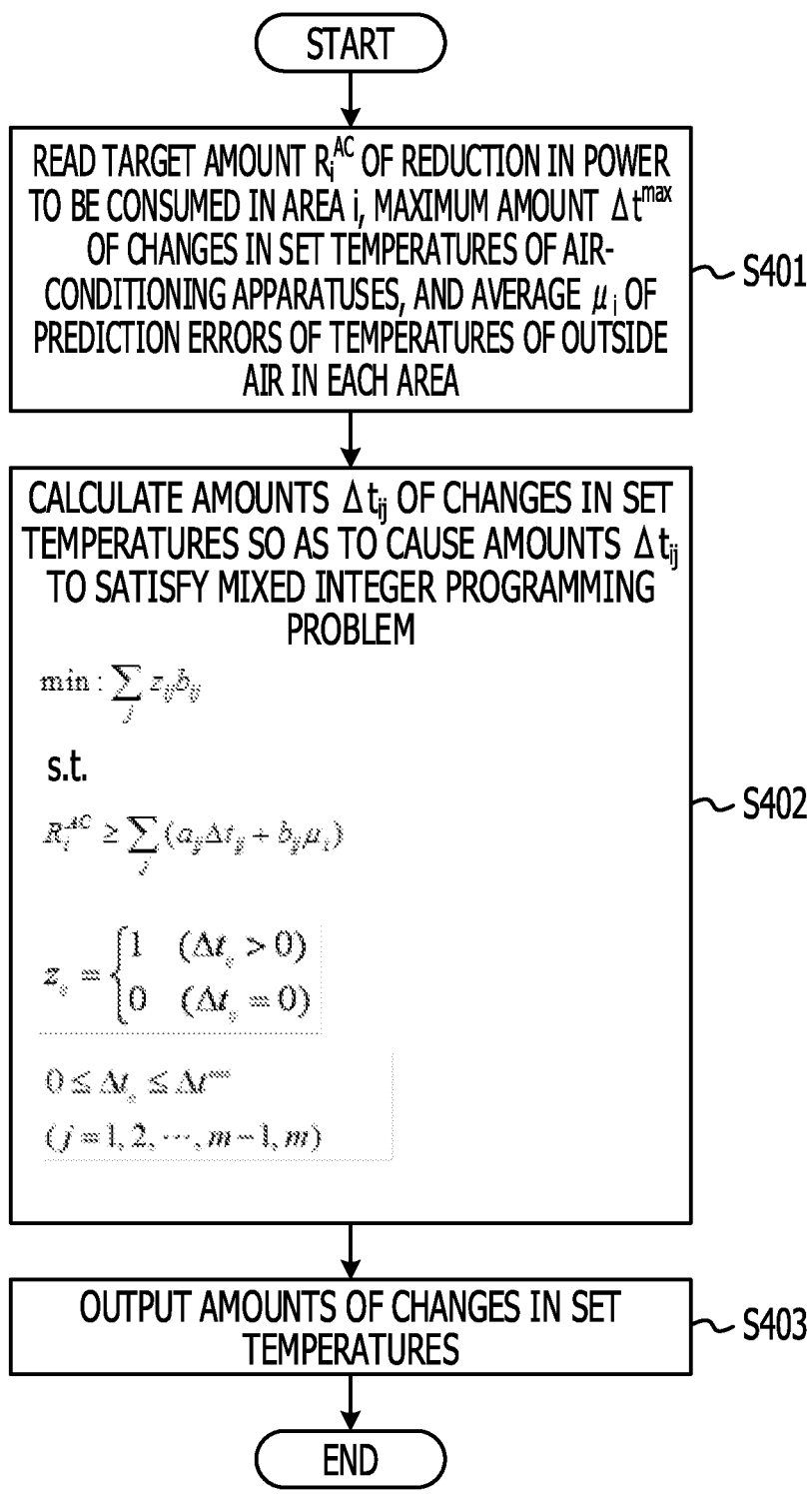
FIG. 15 is a flowchart of an example of a method for determining the amount of a change in a set temperature of an air-conditioning apparatus installed in each site.

FIG. 15 is a flowchart of an example of a method for determining the amounts of the changes in the set temperatures of the air-conditioning apparatuses installed in the sites. Although FIG. 15 indicates a single area i, a process of solving the same problem for all the areas is actually executed. The following description of the process indicates a case where an area i is fixed to any of the numbers 1 to n.

First, the control program developer 17 reads, from the second storage unit 12, a target amount $R_i^{AC}$ of a reduction in power to be consumed in the area i, the maximum amount $\Delta t^{max}$ of the changes in the set temperatures of the air-conditioning apparatuses, and an average $\mu_i$ of prediction errors of temperatures of outside air in each of the areas (in S401). The target amount $R_i^{AC}$ of the reduction in power to be consumed in the area i is the information calculated in S207 illustrated in FIG. 5. The maximum amount $\Delta t^{max}$ of the changes in the set temperatures of the air-conditioning apparatuses is the information set in S201 illustrated in FIG. 5. The average $\mu_i$ of the prediction errors of the temperatures of the outside air in each of the areas is the information calculated in S203 illustrated in FIG. 5.

Subsequently, the control program developer 17 calculates the amounts $\Delta t_{ij}$ (i is any of the numbers 1 to n and j=1, 2, . . . , m) of changes in set temperatures of air-conditioning apparatuses installed in the sites within the area i so that the variance of the amounts of reductions in power to be consumed in the sites is reduced (in S402). A specific example of a process of S402 is described below.

For the air-conditioning apparatuses installed in the sites j within the area i, the amounts of reductions in power to be consumed when the set temperatures of the air-conditioning apparatuses are increased by $\Delta t_{ij}$ are expressed by $s_{ij}$. The amounts $s_{ij}$ of the reductions in power to be consumed by the air-conditioning apparatuses installed in the sites j may be expressed using a linear model of Equation (21) including $s_{ij}$ as an explained variable and $\Delta t_{ij}$ and $\delta T_i$ as explanatory variables.

$$s_{ij} = a_{ij} \Delta t_{ij} + b_{ij} \delta T_i \qquad \text{Equation (21)}$$

(i=1, 2, . . . , n−1, n)
(j=1, 2, . . . , m−1, m)

As indicated by Equation (21), the amounts $s_{ij}$ are affected by prediction errors $\delta T_i$ of temperatures of outside air. Thus, the amounts $s_{ij}$ are random variables and a distribution of the values $s_{ij}$ conforms to a normal distribution indicated by Formula (22).

$$s_{ij} \sim N(a_{ij} \Delta t_{ij} + b_{ij} \mu_i, b_{ij}^2 \sigma_i^2) \qquad \text{Formula (22)}$$

(i=1, 2, . . . , n−1, n)
(j=1, 2, . . . , m−1, m)

In Formula (22), $\mu_i$ is the average of the prediction errors $\delta T_i$, a value of $(a_{ij}\Delta t_{ij} + b_{ij}\mu_i)$ is the average of amounts $s_{ij}$, and $b_{ij}^2 \sigma_i^2$ is variance of the amounts $s_{ij}$.

The total $s_i$ of the amounts of reductions in power to be consumed in all the sites j within the area i may be expressed by the following Equation (23) using $\mu_i$.

$$S_i = \sum_j S_{ij} = \sum_j (a_{ij} \Delta t_{ij} + b_{ij} \mu_i) \qquad \text{Equation (23)}$$

$(i = 1, 2, \ldots, n-1, n)$ $(j = 1, 2, \ldots, m-1, m)$

For a calculation of the amounts $\Delta t_{ij}$ of changes in the set temperatures of the air-conditioning apparatuses installed in the sites j, one of constraints is that the total s of the amounts of reductions in power to be consumed is equal to or smaller than an amount $R_i^{AC}$ (s and $R_i^{AC}$ are load values) of a reduction in power to be consumed in the area i.

In S303, the control program developer 17 uses a solver for mixed integer programming to calculate a solution to a mixed integer programming problem indicated by the following Formula (24) used as an objective function and the following Formulas (25), (26), and (27) used as constraints, for example. Thus, the control program developer 17 may calculate the amounts $\Delta t_{ij}$ of the changes in the set temperatures of the air-conditioning apparatuses installed in the sites.

$$\min: \left(\sum_j z_{ij} b_{ij}\right)^2 \sigma_i^2 \quad \text{Formula (24)}$$

$$(j = 1, 2, \ldots, m-1, m)$$

$$z_{ij} = \begin{cases} 1 & (\Delta t_{ij} > 0) \\ 0 & (\Delta t_{ij} = 0) \end{cases} \quad \text{Formula (25)}$$

$$R_i^{AC} \geq \sum_j (a_{ij}\Delta t_{ij} + b_{ij}\mu_i) \quad \text{Formula (26)}$$

$$(j = 1, 2, \ldots, m-1, m)$$

$$0 \leq \Delta t_{ij} \leq \Delta t^{max} \quad \text{Formula (27)}$$

(j=1, 2, . . . , m–1, m)

Formula (24) is the objective function to be used to cause variance $b_{ij}^2 \sigma_i^2$ of the reduction amounts $s_{ij}$ indicated by Equation (19) to be close to a minimum value. Since the area i is fixed, $\sigma_i^2$ is invariable. The coefficients $b_{ij}$ for a cooling season are positive numbers, Formula (28) obtained by simplifying Formula (24) may be treated as an objective function for the cooling season.

$$\min: \sum_j z_{ij} b_{ij} \quad \text{Formula (28)}$$

$$(j = 1, 2, \ldots, m-1, m)$$

Formula (25) is a constraint for removing, from Formula (24) or (28), a term related to a site in which power to be consumed is not reduced or set temperatures are not changed. In Formula (25), a coefficient $Z_{ij}$ that is 1 or 0 is defined. For example, if a set temperature is to be changed in a certain site, $\Delta t_{ij} > 0$ and thus $Z_{ij} = 1$. In this case, a term related to a site in which a set temperature is not changed is not removed from Equation (24). On the other hand, if the set temperature is not changed in the certain site, $\Delta t_{ij} = 0$ and thus $Z_{ij} = 0$. In this case, a term related to a site in which a set temperature is changed is removed from Formula (24).

Formula (26) is a constraint indicating that the total $s_i$ of the amounts of reductions in power to be consumed in all the sites j (j=1, 2, . . . , m) within the area i is equal to or smaller than the amount $R_i^{AC}(R_i^{AC} < 0)$ of the reduction in the area i. Formula (27) is a constraint indicating that the amounts $\Delta t_{ij}$ (j=1, 2, . . . , m) of the changes in the set temperatures do not exceed the maximum amount $\Delta t^{max}$ of the changes in the set temperatures.

After a process of S303 is terminated, a series of processes illustrated in FIG. 15 is executed on the other areas. Thus, the amounts of the changes in the set temperatures of the air-conditioning apparatuses installed in the sites within all the areas i (i=1, 2, . . . , n) may be calculated on a site basis.

Subsequently, the output unit 18 outputs the calculated amounts $\Delta t_{ij}$ (i=1, 2, . . . , n, j=1, 2, . . . , m) of the changes in the air-conditioning apparatuses installed in the sites (in S403). In the aforementioned manner, the amounts of the changes in the set temperatures of the air-conditioning apparatuses installed in the sites within the areas may be determined.

Returning to FIG. 4, after the process of S102, the program development device 10 controls the air-conditioning apparatuses in accordance with the determined amounts of the changes in the set temperatures (in S103). Specifically, the control executing unit 19 transmits, through the network 40 to the air-conditioning apparatuses 70 installed in the sites, an instruction signal indicating an instruction to change the set temperatures of the air-conditioning apparatuses installed in the sites by the amounts $\Delta t_{ij}$ calculated by the control program developer 17. Then, the air-conditioning apparatuses 70 that have received the instruction signal change the set temperatures in accordance with details of the instruction signal.

In the aforementioned manner, the amounts $\Delta t_{ij}$ of the changes in the set temperatures of the air-conditioning apparatuses installed in the sites within the areas may be determined.

According to the process of S102, based on target amounts, assigned to the plurality of areas, of reductions in power to be consumed in the plurality of areas, the amounts of changes in set temperatures of air-conditioning apparatuses 70 installed in a predetermined area among the plurality of areas are determined so that variance of the amounts of reductions in power to consumed in the predetermined area is reduced. According to this method, the variance of the amounts of the reductions in power to be consumed in the areas is considered in order to determine the amounts of the changes in the set temperatures of the air-conditioning apparatuses 70 on an air-conditioning apparatus basis. Thus, errors between planned amounts of reductions and the amounts of actual reductions may be reduced. As a result, the reductions in power to be consumed may be executed with high accuracy.

In order to develop a program for controlling power to be consumed, a process of assigning a target amount of a reduction in power to be consumed to each of the areas included in the target area 100 and a process of determining the amounts of changes in the set temperatures of the air-conditioning apparatuses installed in the sites are separately executed. According to this method, the air-conditioning apparatuses 70 may be controlled in order from an area for which the processes have been completed. Thus, if the target area 100 is large, it is possible to minimize a delay time taken until the control is started.

Although the embodiment is described above, the techniques disclosed herein are not limited to the embodiment and may be variously modified and changed. For example, although the embodiment describes the case where apparatuses to be subjected to the control of power to be consumed are the air-conditioning apparatuses, the embodiment is applicable to apparatuses other than air-conditioning apparatuses.

Although a process of S202 is executed after the process of S201 in the flowchart illustrated in FIG. 5, the process of S202 may be executed before the process of S201.

The amounts of the changes in the set temperatures are calculated in the two processes of S101 and S102 in the embodiment, but may be calculated in a single process. If the amounts of the changes in the set temperatures are calculated in the single process, the amounts $\Delta t_{ij}$ of the changes in the set temperatures of the air-conditioning apparatuses 70 installed in the target area may be calculated by solving an optimization problem indicated by the following Formula

(29) used as an objective function and the following Formulas (30), (31), and (32) used as constraints, for example.

$$\min: \sum_{i,j,k,l} b_{ij}x_{ij} \cdot b_{kl}x_{kl} \cdot \sigma_{ik} \qquad \text{Formula (29)}$$

In Formula (29), $\sigma_{ik}$ is covariance between $\delta T_i$ and $\delta T_k$.

$$R_i^{AC} \geq \sum_{i,j} (a_{ij}\Delta t_{ij} + b_{ij}\mu_i) \qquad \text{Formula (30)}$$

In Formula (30), $R^{AC}$ is the target amount of the reduction in power to be consumed ($R^{AC}<0$) [kWh].

$$x_{ij} = \begin{cases} 1 & (\Delta t_{ij} > 0) \\ 0 & (\Delta t_{ij} = 0) \end{cases} \qquad \text{Formula (31)}$$

$$x_{kl} = \begin{cases} 1 & (\Delta t_{kl} > 0) \\ 0 & (\Delta t_{kl} = 0) \end{cases} \qquad \text{Formula (32)}$$

Formula (29) is an objective function for solving the amounts $\Delta t_{ij}$ of the changes in the set temperatures so as to reduce the variance of the amounts of the reductions in power to be consumed in the target area 100. Symbols i and k indicate indexes that identify areas included in the target area 100, while a symbol j indicates an index that identifies a site j within an area i. A symbol l is an index that identifies a site l within an area k. Formulas (31) and (32) are constraints for removing, from Formula (29), a term related to a site in which power to be consumed is not reduced or set temperatures are not changed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing method executed by a system that includes a plurality of air-conditioning apparatuses respectively arranged on each of a plurality of subareas within a target area and a program development device coupled to the plurality of air-conditioning apparatus, the information processing method comprising:
   measuring, by the plurality of air-conditioning apparatuses, a power consumption for each of the plurality of air-conditioning apparatuses;
   setting, by the program development device, an area target amount of reduction in power consumption of the target area based on the power consumption measured by each of the plurality of air-conditioning apparatuses;
   acquiring a predicted value and a measured value of outdoor temperature at each of the plurality of subareas;
   calculating, for each of the plurality of subareas, a prediction error of outdoor temperature by calculating a difference between the predicted value and the measured value;
   calculating, for each of the plurality of subareas, a utilization rate indicating a rate of assignment of the area target amount of reduction in power consumption by solving an objective function generated based on the area target amount of reduction and a variance of the prediction error of outdoor temperature;
   assigning, to each of the plurality of subareas, a subarea target amount of reduction in power consumption based on the utilization rate; and
   operating, by the plurality of air-conditioning apparatuses, to maintain a setting temperature determined based on the subarea target amount of reduction assigned for each of the plurality of subareas.

2. The information processing method according to claim 1,
   wherein the calculating of the utilization rate comprises solving an objective function including a variance-covariance matrix of the prediction error.

3. The information processing method according to claim 1, further comprising:
   determining amounts of changes in set temperatures of air-conditioning apparatuses installed in each of the plurality of the subareas, based on the subarea target amounts of reduction in power consumption for each of the plurality of subareas.

4. The information processing method according to claim 3,
   wherein the determining comprises determining amounts of changes in set temperatures of a plurality of air-conditioning apparatuses installed in a predetermined subarea among the plurality of subareas so that the variance of the amounts of reductions in power consumption in the predetermined subarea is reduced.

5. The information processing method according to claim 4,
   wherein the determining comprises determining the amounts of the changes in the set temperatures of the air-conditioning apparatuses installed in sites within the predetermined subarea on a site basis.

6. The information processing method according to claim 4, further comprising:
   transmitting, to the plurality of air-conditioning apparatuses, an instruction signal providing an instruction to change the amounts of the changes in the set temperatures of the plurality of air-conditioning apparatuses.

7. The information processing method according to claim 1, further comprising:
   acquiring, for each of the plurality of air-conditioning apparatuses, information of a set temperature and a change upper limit of an amount of change in the set temperature,
   calculating, for each of the plurality of air-conditioning apparatuses, a primary coefficient for the set temperature and the outdoor temperature using a linear model in which power consumption of each of the plurality of air-conditioning apparatuses is expressed by a function of the set temperature and the outdoor temperature;
   calculating, for each of the plurality of subareas, a reduction upper limit of an amount of the reduction in power consumption, based on the primary coefficient, the change upper limit of amount of the change in the set temperature, and the prediction error; and calculating a sum of the reduction upper limit of the amount of the reductions in power consumption for each of the plurality of subareas, and the calculating of the utilization rate comprises calculating the utilization rate when the sum of the reduction upper limit of the amount of the reductions in power consumption is equal or less than the subarea target amount of reduction in power consumption.

8. The information processing method according to claim 7, wherein the primary coefficient comprises a first coefficient for the set temperature and a second coefficient for the outdoor temperature, and wherein the calculating of the reduction upper limit of the amount of the reductions in power consumption comprises:

calculating, for each of the plurality of subareas, a sum of the first coefficient and a sum of the second coefficient;

calculating, for each of the plurality of subareas, an average of the prediction error of outdoor temperature; and obtaining, for each of the plurality of subareas, the reduction upper limit of the amount of the reductions in power consumption by calculating a sum of a first member and a second member, the first member being a product of the sum of the first coefficient and the change upper limit of amount of the change in the set temperature, and the second member being a product of the sum of the second coefficient and the average of the prediction error.

9. The information processing method according to claim 7, wherein the calculating of the utilization rate comprises solving an objective function including the primary coefficient and the variance of the predicted value of outdoor temperature.

10. A program development device coupled to a plurality of air-conditioning apparatus respectively arranged on each of a plurality of subareas within a target area, the program development device comprising:

a memory; and a processor coupled to the memory and configured to:

acquire a power consumption for each of the plurality of air-conditioning apparatuses measured by the plurality of air-conditioning apparatuses, set an area target amount of reduction in power consumption of the target area based on the power consumption measured by each of the plurality of air-conditioning apparatuses, acquire a predicted value and a measured value of outdoor temperature at each of the plurality of subareas, calculate, for each of the plurality of subareas, a prediction error of outdoor temperature by calculating a difference between the predicted value and the measured value, calculate, for each of the plurality of subareas, a utilization rate indicating a rate of assignment of the area target amount of reduction in power consumption by solving an objective function generated based on the area target amount of reduction and a variance of the prediction error of outdoor temperature, and assign, to each of the plurality of subareas, a subarea target amount of reduction in power consumption based on the utilization rate, wherein the plurality of air-conditioning apparatuses are configured to operate to maintain a setting temperature determined based on the subarea target amount of reduction assigned for each of the plurality of subareas.

11. A computer-readable non-transitory recording medium storing a program causing a computer to execute a process, the process comprising:

acquiring a power consumption for each of the plurality of air-conditioning apparatuses measured by the plurality of air-conditioning apparatuses;

setting an area target amount of reduction in power consumption of the target area based on the power consumption measured by each of the plurality of air-conditioning apparatuses;

acquiring a predicted value and a measured value of outdoor temperature at each of the plurality of subareas;

calculating, for each of the plurality of subareas, a prediction error of outdoor temperature by calculating a difference between the predicted value and the measured value;

calculating, for each of the plurality of subareas, a utilization rate indicating a rate of assignment of the area target amount of reduction in power consumption by solving an objective function generated based on the area target amount of reduction and a variance of the predicted value of outdoor temperature; and assigning a subarea target amount of reduction in power consumption to each of the plurality of subareas based on the utilization rate, wherein the plurality of air-conditioning apparatuses are configured to operate to maintain a setting temperature determined based on the subarea target amount of reduction assigned for each of the plurality of subareas.

* * * * *